(12) United States Patent
Todd (10) Patent No.: US 12,546,408 B2
(45) Date of Patent: Feb. 10, 2026

(54) CARTRIDGE-TYPE BALL VALVE

(71) Applicant: M & M Oil Tools, LLC, Breaux Bridge, LA (US)

(72) Inventor: Andy Paul Todd, Lafayette, LA (US)

(73) Assignee: M&M Oil Tools, LLC, Breaux Bridge, LA (US)

( * ) Notice: Subject to any disclaimer, the term of this patent is extended or adjusted under 35 U.S.C. 154(b) by 29 days.

(21) Appl. No.: 18/495,008

(22) Filed: Oct. 26, 2023

(65) Prior Publication Data
US 2024/0142015 A1 May 2, 2024

Related U.S. Application Data

(60) Provisional application No. 63/419,572, filed on Oct. 26, 2022.

(51) Int. Cl.
*F16K 27/06* (2006.01)
*F16K 5/06* (2006.01)

(52) U.S. Cl.
CPC .......... *F16K 27/067* (2013.01); *F16K 5/0689* (2013.01); *F16K 2200/501* (2021.08)

(58) Field of Classification Search
CPC ............. F16K 5/0689; F16K 2200/501; F16K 5/0642; F16K 27/067
See application file for complete search history.

(56) References Cited

U.S. PATENT DOCUMENTS

| | | | |
|---|---|---|---|
| 3,462,120 A * | 8/1969 | Priese | F16K 5/0673 251/317 |
| 3,678,556 A | 7/1972 | Shafer | |
| 3,760,833 A | 9/1973 | Kemp et al. | |
| 5,346,178 A | 9/1994 | Baker | |
| 5,529,285 A | 6/1996 | McKnight et al. | |
| 7,690,626 B2 * | 4/2010 | Stunkard | F16K 5/0642 251/315.08 |
| 8,794,253 B2 * | 8/2014 | Avdjian | F16K 27/067 137/15.01 |
| 9,551,425 B2 | 1/2017 | Buck | |

(Continued)

OTHER PUBLICATIONS

PCT International Searching Authority/US, International Search Report and Written Opinion, mailed Mar. 5, 2024, for corresponding international patent application No. PCT/US23/77870.

*Primary Examiner* — Michael R Reid
(74) *Attorney, Agent, or Firm* — Jones Walker LLP (57) ABSTRACT

A ball valve includes valve seats surrounding a valve ball and a valve housing surrounding the valve seats. A central flow passage extends through the valve seats, the valve ball, and the valve housing. Seals are positioned between a non-vertical bottom wall of each valve seat and corresponding non-vertical end walls of the valve housing. When a fluid pressure is applied to the ball valve in a closed position, one of the valve seats moves away from the valve housing to disengage the seal from the corresponding non-vertical housing end wall. The valve seat's movement provides an equalizing flow passage between the valve seat and the valve housing and into an interior portion of the valve ball, thereby allowing for pressure equalization that prevents deformation of the valve ball. The valve housing is formed by valve seat carriers, a cavity in a valve sub, or a combination thereof.

19 Claims, 5 Drawing Sheets

(56) References Cited

U.S. PATENT DOCUMENTS

| | | | |
|---|---|---|---|
| 11,512,783 B2 * | 11/2022 | Vijay | F16K 3/0254 |
| 2011/0260089 A1 | 10/2011 | Xu et al. | |
| 2016/0319940 A1 | 11/2016 | Funato et al. | |
| 2017/0138504 A1 | 5/2017 | Hoots et al. | |

* cited by examiner

CARTRIDGE-TYPE BALL VALVE

CROSS-REFERENCE TO RELATED APPLICATIONS

This application claims the benefit of and priority to U.S. Provisional Patent Application No. 63/419,572, filed on Oct. 26, 2022, which is incorporated herein by reference in its entirety.

BACKGROUND

Ball valves are used as fluid shutoff valves in a variety of applications, including onshore and offshore oil and gas production. These ball valves often include a valve ball surrounded by valve seats and valve seat carriers holding the valve seats in place. To prevent deformation of the valve ball when the valve is in the closed position, pressures inside of the valve ball and below the valve ball must be equalized. This pressure equalization is typically accomplished by allowing fluid to flow through one-way seals positioned between the valve seats and the valve seat carriers and into the valve ball. However, in applications involving particulates, the seals often become clogged, preventing fluid flow into the valve ball. Certain prior art solutions provide an additional means for fluid to flow into the valve ball. For example, U.S. Pat. No. 9,551,425 issued on Jan. 24, 2017, which is incorporated herein by reference in its entirety, discloses a ball valve in which the valve seat separates from the valve ball to provide an efficient fluid passageway therebetween. However, these prior art attempts required designs with significant internal spacing between the components of the ball valve, i.e., a long ball valve. Accordingly, there is a need for a ball valve that provides additional means for fluid flow into the valve ball while maintaining a shorter length of the ball valve. Such a ball valve is disclosed herein.

SUMMARY OF THE DISCLOSURE

The present disclosure relates to a ball valve including a valve housing having a vertical side wall, a first non-vertical end wall, and a second non-vertical end wall. The ball valve may further include a first valve seat having a bottom wall parallel to the first non-vertical end wall. The ball valve may further include a second valve seat having a bottom wall parallel to the second non-vertical end wall. The ball valve may further include a first seal positioned between the bottom wall of the first valve seat and the first non-vertical end wall and a second seal positioned between the bottom wall of the second valve seat and the second non-vertical end wall. The ball valve may further include a valve ball positioned between the first valve seat and the second valve seat. A central flow passage may extend through the first non-vertical end wall of the valve housing, the first valve seat, the valve ball, the second valve seat, and the second non-vertical end wall of the valve housing.

In another embodiment, at least a section of each of the bottom wall of the first valve seat, the first non-vertical end wall of the valve housing, the bottom wall of the second valve seat, and the second non-vertical end wall of the housing may be inclined toward the central flow passage at an angle of between about 20° and about 70° relative to the vertical wall of the valve housing.

In yet another embodiment, at least a section of each of the bottom wall of the first valve seat, the first non-vertical end wall of the valve housing, the bottom wall of the second valve seat, and the second non-vertical end wall of the valve housing may be inclined toward the central flow passage at an angle of about 90° relative to the vertical wall of the valve housing.

In yet another embodiment, the first non-vertical end wall of the valve housing and the second non-vertical end wall of the valve housing each include (i) a first section inclined toward the central flow passage at an angle of between about 20° and about 70° relative to the vertical wall of the valve housing and (ii) a second section inclined toward the central flow passage at an angle of about 90° relative to the vertical wall of the valve housing.

In yet another embodiment, the first seal and the second seal may be one-way seals.

In yet another embodiment, the ball valve may further include a first spring positioned between the first non-vertical end wall of the valve housing and the bottom wall of the first valve seat and a second spring positioned between the second non-vertical end wall of the valve housing and the bottom wall of the second valve seat.

In yet another embodiment, the first spring and the second spring may be wave springs.

In yet another embodiment, the valve housing may further include a first valve seat carrier and a second valve seat carrier. The first valve seat carrier and the second valve seat carrier may define the vertical side wall. The first valve seat carrier may define the first non-vertical end wall. The second valve seat carrier may define the second non-vertical end wall.

In yet another embodiment, the ball valve may further include two brackets securing the first valve seat carrier to the second valve seat carrier to form a ball valve cartridge.

In yet another embodiment, the first non-vertical end wall may be formed on an interior surface of a valve sub and the second non-vertical end wall may be formed on a valve seat carrier.

In yet another embodiment, a retaining ring may secure the valve seat carrier within the valve sub.

In yet another embodiment, the first non-vertical end wall and the second non-vertical end wall may be formed on interior surfaces of a valve sub.

In yet another embodiment, the first valve seat may be configured to move with respect to the valve housing a distance sufficient to cause the first seal to disengage from the first non-vertical end wall of the valve housing.

In yet another embodiment, no seal may engage a portion of the vertical side wall occupied by the first valve seat and the second valve seat.

In yet another embodiment, a height of the valve cartridge between outer surfaces of the first valve seat carrier and the second valve seat carrier may be less than 140% of an outer diameter of the valve ball.

The disclosure also relates to a ball valve including a valve housing having a vertical side wall and a non-vertical end wall. The ball valve may further include a valve seat having a bottom wall parallel to the non-vertical end wall. The ball valve may further include a seal positioned between the bottom wall of the valve seat and the non-vertical end wall. The ball valve may further include a valve ball engaging the valve seat. The ball valve may further include a central flow passage extending through the non-vertical end wall, the valve seat, and the valve ball. In a closed position, the valve seat is configured to move relative to the valve housing a distance sufficient to cause the seal to disengage from the first non-vertical end wall of the valve housing and to provide an equalizing fluid passage between the valve seat and the valve housing in response to a fluid pressure.

In another embodiment, at least a first section of each of the bottom wall of the first valve seat and the first non-vertical end wall of the valve housing may be inclined toward the central flow passage at an angle of between about 20° and about 70° relative to the vertical wall of the valve housing. The seal is positioned between the first section of the bottom wall of the valve seat and the first section of the non-vertical end wall of the valve housing.

In yet another embodiment, at least a section of each of the bottom wall of the valve seat and the non-vertical end wall of the valve housing may be inclined toward the central flow passage at an angle of about 90° relative to the vertical wall of the housing.

In yet another embodiment, the each of the bottom wall of the valve seat and the non-vertical end wall of the valve housing may include (i) a first section inclined toward the central flow passage at an angle of between about 20° and about 70° relative to the vertical wall of the valve housing and (ii) a second section inclined toward the central flow passage at an angle of about 90° relative to the vertical wall of the valve housing; wherein the seal is positioned between the first section of the bottom wall of the valve seat and the first section of the non-vertical end wall of the valve housing.

The disclosure also relates to a ball valve including a first valve seat and a second valve seat, each including vertical interior side walls and a bottom wall that has a non-vertical section with a seal groove. A seal is positioned in the seal groove in the non-vertical section of each of the first valve seat and the second valve seat. The ball valve also includes a valve ball sized to seal against the first valve seat and the second valve seat. A central flow passage extends through the first valve seat, the valve ball, and the second valve seat.

The disclosure further relates to a valve seat including an annular valve seat body having a central flow passage, an upper surface, a vertical wall, and a bottom wall. The upper surface of the valve seat body includes (i) a curvature complementary to a valve ball, and (ii) a seat seal disposed within a seal groove. The bottom wall of the valve seat body includes (i) a first section included toward the central flow passage at an angle of between about 20° and about 70° relative to the vertical wall, and (ii) a second section inclined toward the central flow passage at an angle of about 90° relative to the vertical wall.

DETAILED DESCRIPTION OF SELECTED EMBODIMENTS

Disclosed herein is a ball valve assembly having a valve ball, valve seats, and a valve housing. The valve seats and/or the valve housing include a vertical sidewall and one or more non-vertical end walls. The valve housing may include valve seat carriers or a cavity within a valve sub. Seals may be disposed between the valve ball, valve seats, and valve housing (e.g., valve seat carriers). The ball valve may be configured to allow the valve seats to move away from the valve housing upon application of a fluid pressure. This movement breaks any seal between the valve seats and the valve housing, allowing a small amount of fluid to flow therebetween and into the valve ball for pressure equalization. FIGS. 1-10 illustrate exemplary embodiments of the ball valve assembly disclosed herein, with many other embodiments within the scope of the claims being readily apparent to skilled artisans after reviewing this disclosure.

Figure 1:
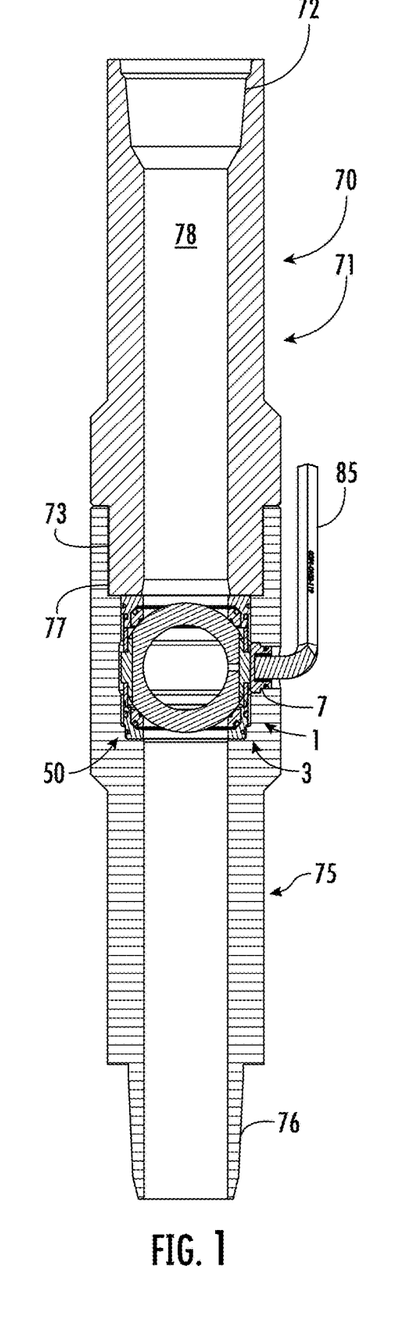
FIG. 1 is a sectional view of a ball valve of the present invention disposed in a valve sub.

FIG. 1 illustrates one embodiment of the ball valve assembly 1 of the present disclosure. Ball valve assembly 1 may be disposed within valve sub 70. Valve sub 70 may generally comprise upper sub half 71 and lower sub half 75. As used herein, the term "upper" refers to the components (e.g., sub half, valve seat carrier) oriented in the "up hole" direction or upstream direction, while the term "lower" refers to components (e.g., sub half, valve seat carrier) oriented in the "down hole" direction or downstream direction. This upper and lower description of valve orientation equally applies to valves positioned outside the wellbore, e.g., mud saver valves positioned between a top drive and the wellbore opening. Additionally, mirrored parts may alternatively be referred to as "first" and "second," rather than "upper" and "lower."

Upper sub half 71 may include external box threads 72 at an upper end and internal pin threads 73 at a lower end, while lower sub half 75 may include internal box threads 77 at an upper end and external pin threads 76 at a lower end. When threaded together, internal pin threads 73 and internal box threads 74 may join upper sub half 71 and lower sub half 75. Valve sub 70 may include a bore forming central passage 78 so that fluid may flow therethrough. In the FIG. 1 embodiment, valve housing cavity 50 may be formed within lower sub half 75, with valve housing cavity 50 essentially being a cavity sized to receive ball valve cartridge 3.

Figure 2:
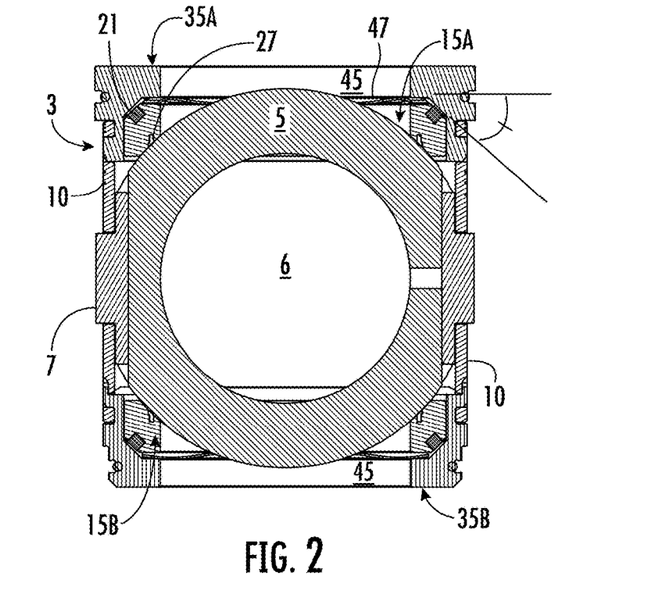
FIG. 2 is a sectional view of the ball valve cartridge in a closed position.
Figure 3:
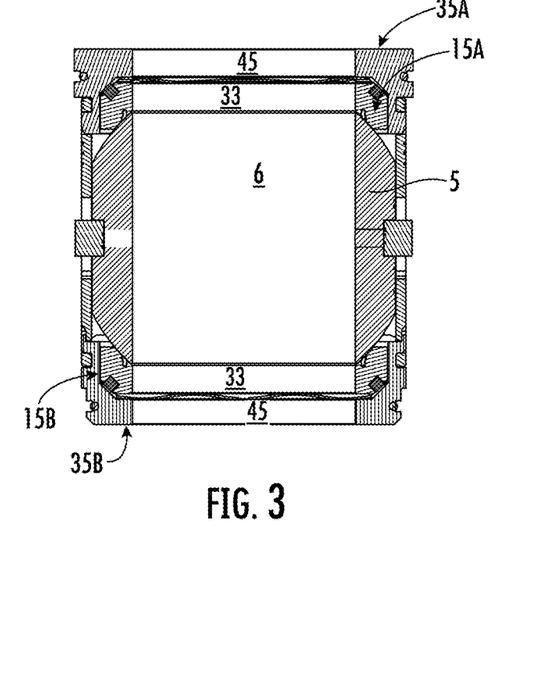
FIG. 3 is a sectional view of the ball valve cartridge in an open position.

FIGS. 2-3 illustrate ball valve cartridge 3 in greater detail. Ball valve cartridge 3 may include upper valve seat carrier 35A and lower valve seat carrier 35B. Upper valve seat carrier 35A and lower valve seat carrier 35B may each include central passage 45. Brackets 10 may join upper valve seat carrier 35A and lower valve seat carrier 35B together. For example, brackets 10 may join upper valve seat carrier 35A and lower valve seat carrier 35B in the same way that "tongues" join the two valve seat carriers in U.S. Pat. No. 9,551,425.

As shown in FIGS. 2-3, ball valve cartridge 3 may further include upper valve seat 15A and lower valve seat 15B. Upper valve seat 15A may be disposed within upper valve seat carrier 35A, while lower valve seat 15B may be disposed within lower valve seat carrier 35B. Upper valve seat carrier 35A and lower valve seat carrier 35B may be sized to allow some movement of upper valve seat 15A toward lower valve seat carrier 35B, and lower valve seat 15B toward upper valve seat carrier 35A, when valve ball 5 is disposed therein. Upper valve seat 15A and lower valve seat 15B may each include a central passage 33 (shown in FIG. 3).

Still referring to FIGS. 2-3, valve ball 5 may be disposed between upper valve seat 15A and lower valve seat 15B. Valve ball 5 may include ball valve passage 6 extending therethrough. Valve ball 5 may be engaged by valve stem 7, which can be used to rotate valve ball 5 between an opened position and a closed position. Wrench 85 is shown engaging the valve stem 7 in FIG. 1. FIG. 2 shows valve ball 5 in the closed position, wherein ball valve passage 6 is misaligned with central passages 33 of upper valve seat 15A and lower valve seat 15B and central passages 45 of upper valve seat carrier 35A and lower valve seat carrier 35B. In the closed position, fluid is restricted from flowing through ball valve assembly 1. FIG. 3 shows valve ball 5 in the open position, wherein ball valve passage 6 is aligned with central passages 33 of upper valve seat 15A and lower valve seat 15B and central passages 45 of upper valve seat carrier 35A and lower valve seat carrier 35B. In the open position, fluid flowing along central passage 78 of valve sub 70 can flow through ball valve assembly 1.

Figure 4:
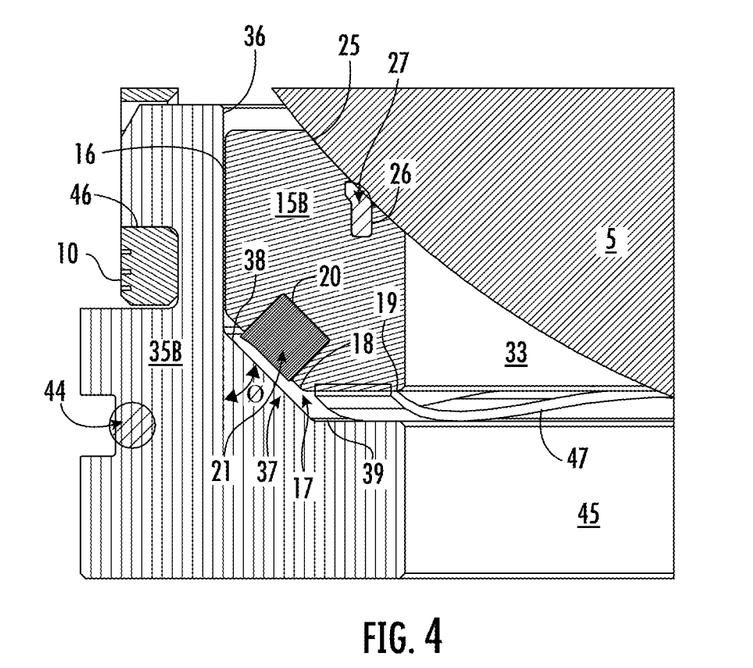
FIG. 4 is a detail sectional view of a valve seat carrier and a valve seat of the ball valve cartridge shown in FIG. 2.
Figure 5:
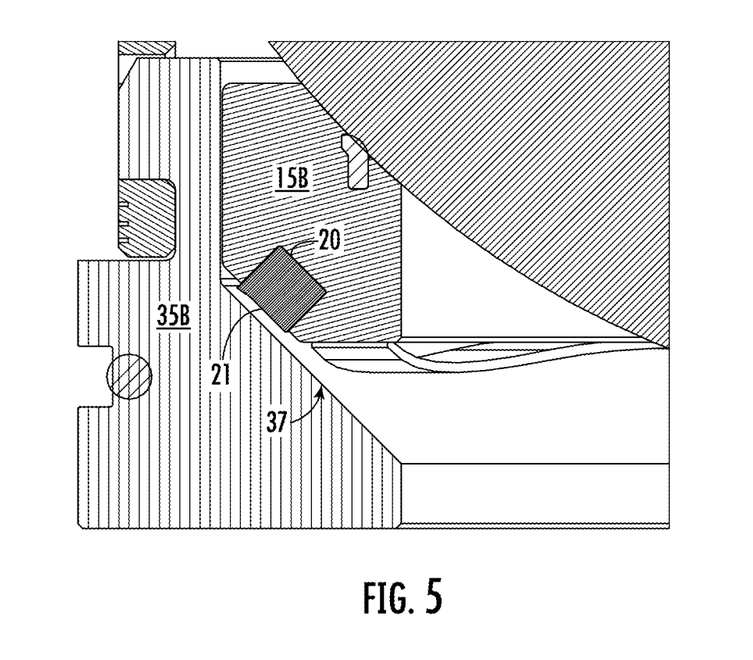
FIG. 5 is a detail sectional view of an alternate embodiment of the valve seat carrier shown in FIG. 4.

FIGS. 4-5 illustrate in greater detail the features of a portion of lower valve seat 15B and lower valve seat carrier 35B. Upper valve seat 15A and upper valve seat carrier 35A may include features identical to those described in relation to lower valve seat 15B and lower valve seat carrier 35B, respectively. As shown in FIG. 4, an external side of lower valve seat carrier 35B may include external seal groove 44. External seal groove 44 may be configured to receive a seal that seals against valve housing cavity 50 (shown in FIG. 1). The external side of lower valve seat carrier 35B may further include bracket indentation 46 for receiving bracket 10.

On its internal side, lower valve seat carrier 35B may include vertical side wall 36 and non-vertical end wall 37. As used herein, "vertical" means generally parallel to the direction of fluid flow through central passages 33 of upper valve seat 15A and lower valve seat 15B and through central passages 45 of upper valve seat carrier 35A and lower valve seat carrier 35B, while "non-vertical" means angularly rotated relative to the "vertical" direction. In FIG. 4, non-vertical end wall is shown inclined inwardly toward central passages 45 of valve seat carriers 35A and 35B at angle θ relative to vertical side wall 36. By way of example only, angle θ may be between about 20° and about 90° (or any subrange therein), preferably between about 20° and about 70° (or any subrange therein). In one preferred embodiment, angle θ may be approximately 45°.

In the FIG. 4 embodiment, non-vertical end wall 37 may be broken into first section 38 and second section 39 each having a different angle θ relative to vertical side wall 36. As one skilled in the art will recognize, angle θ may be any angle. By way of example only, first section 38 may have an angle θ of about 45°, while second section 39 may have an angle θ of 90° (i.e., perpendicular to vertical side wall 36). However, in alternate embodiments, the entire length of non-vertical end wall 37 could have a single angle θ as shown in FIG. 5. In a further alternate embodiment not specifically illustrated, the entire length of non-vertical end wall 37 could have a single angle θ of 90° (i.e., perpendicular to vertical side wall 36).

As shown in FIG. 4, lower valve seat 15B may include vertical side wall 16 and non-vertical bottom wall 17 corresponding to vertical side wall 36 and non-vertical end wall 37 of lower valve seat carrier 35B. Vertical side wall 16 and non-vertical bottom wall 17 may have the same angle θ, or a similar angle θ, as vertical side wall 36 and non-vertical end wall 37 of lower valve seat carrier 35B. In this way, vertical side wall 16 and non-vertical bottom wall 17 are parallel to vertical side wall 36 and non-vertical end wall 37 of lower valve seat carrier 35B. Just as non-vertical end wall 37 of lower valve seat carrier 35B may be broken into first section 38 and second section 39, non-vertical bottom wall 17 of lower valve seat 15B may be broken into first section 18 and second section 19.

Non-vertical bottom wall 17 may include seal groove 20 for housing seal 21, which is configured to seal between lower valve seat carrier 35B and lower valve seat 15B. In some embodiments, seal may be positioned between non-vertical bottom wall 17 of lower valve seat 15B and non-vertical end wall 37 of lower valve seat carrier 35B. Seal 21 may be any type of seal, such as any conventional seal or suitable future developed seal. By way of example only, seal 21 may be an o-ring or any other two-way seal. Seal 21 may be a one-way seal oriented to have a flow direction from central passage 33 of lower valve seat 15B, through seal 21, and in an upstream direction between vertical side wall 36 of lower valve seat carrier 35B and vertical side wall 16 of lower valve seat 15B. By way of example only, seal 21 may be a loaded U-cup one-way seal such as a PolyPak® seal. Lower valve seat 15B may further include valve seat seal groove 26. Valve seat seal groove 26 may be configured to receive a valve seat seal 27 which seals against valve ball 5.

FIG. 4 further shows an optional spring 47 positioned between non-vertical bottom wall 17 of valve seal 15B and non-vertical end wall 37 of lower valve seat carrier 35B. In some embodiments, spring 47 may be positioned between second section 19 of bottom wall 17 and second section 39 of non-vertical end wall 37. Spring 47 may be positioned to apply force between second section 19 of non-vertical bottom wall 17 and second section 39 of non-vertical end wall 37. Spring 47 may be any type of spring. By way of example only, spring 47 may be a disc spring (or "wave" spring). Spring 47 may bias lower valve seat 15B against valve ball 5, thus maintaining a sealing engagement between valve ball 5 and seals 27. In other embodiments, the ball valve assembly includes no spring.

Though not particularly illustrated, it will be understood that in the disclosed embodiments, upper valve seat 15A and upper valve seat carrier 35A will be substantially and functionally identical in structure to lower valve seat 15B and lower valve seat carrier 35B.

When ball valve assembly 1 is in the closed position (as shown in FIG. 2), fluid pressure may be applied from below the valve (i.e., upward against valve ball 5 and lower valve seat 15B in FIG. 2). Upon the application of this fluid pressure, valve ball 5 may engage seal 27 on the seal surface 25 of lower valve seat 15B with more force. Simultaneously, seal 21 on non-vertical bottom wall 17 of upper valve seat 15A more forcefully seals against corresponding non-vertical end wall 37 of upper valve seat carrier 35A. Seal 27 of lower valve seat 15B and seal 21 of upper valve seat 15A prevent pressurized fluid from flowing past upper valve seat 15A and upper valve seat carrier 35A (i.e., preventing pressurized fluid from bypassing ball valve assembly 1 in the closed position).

In the closed position, the same fluid pressure is acting to move seal 21 on lower valve seat 15B away from corresponding non-vertical end wall of lower valve seat carrier 35B. Because the distance between upper valve seat carrier 35A and lower valve seat carrier 35B may be sized to allow some movement of upper valve seat 15A toward lower valve seat carrier 35B and lower valve seat 15B toward upper valve seat carrier 35A. Thus, lower valve seat 15B may move a sufficient distance toward upper valve seat carrier 35A such that fluid may flow around seal 21 via an equalizing fluid passage between seal 21 and non-vertical end wall 37 of lower valve seat carrier 35B.

The positioning of seal 21 on non-vertical end wall 37 of lower valve seat carrier 35B contributes to the ability of fluid to flow around seal 21 with minimal movement of lower valve seat 15B. With seal 21 on a non-vertical surface, the seal is broken with less movement of lower valve seat 15B than if seal 21 was positioned on vertical side wall 36 of lower valve seat carrier 35B (e.g., as in the prior art designs). In certain embodiments, valve seats 15A and 15B each has sufficient space to move between 0.060 inches and 0.2 inches from corresponding valve seat carriers 25A and 25B, respectively.

One advantage of fluid flowing around lower valve seat 15B is that fluid will flow into valve ball passage 6 of valve ball 5 and equalize pressure below valve ball 5 and internally within valve ball passage 6, thus eliminating the forces that would otherwise tent to deform the ball out-of-round. Although fluid should in theory be able to flow through seal 21, particulates in well fluid can often obstruct the passages through seal 21, necessitating a design that efficiently allows fluid to flow around seal 21. Prior art attempts to solve this problem designed the valve seat to separate from the valve ball. However, this prior art attempt necessitates greater internal spacing within the valve cartridge, resulting in a greater overall cartridge length, i.e., the dimension between the exterior bottom surfaces of valve seat carriers. To the contrary, one advantage of the disclosed embodiments is that the above pressure equalizing function is accomplished with so little movement of the valve seats, thereby allowing smaller overall cartridge length. In the illustrated embodiments, the overall cartridge length is less than 140% (and more preferably less than 120%) of the valve ball's outer diameter.

Figure 6:
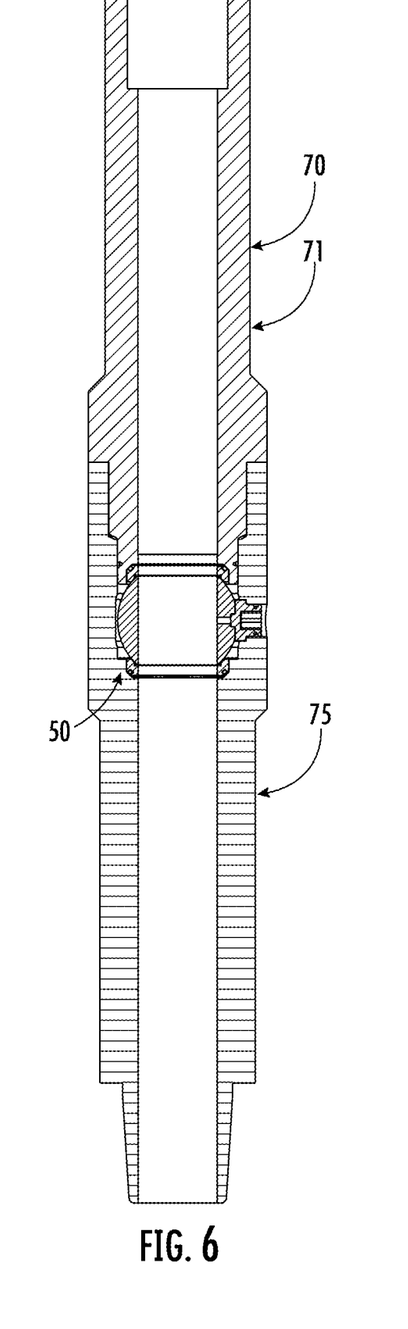
FIG. 6 is a sectional view of an alternate embodiment of the ball valve in which the valve seat carriers are formed by the valve sub.
Figure 7:
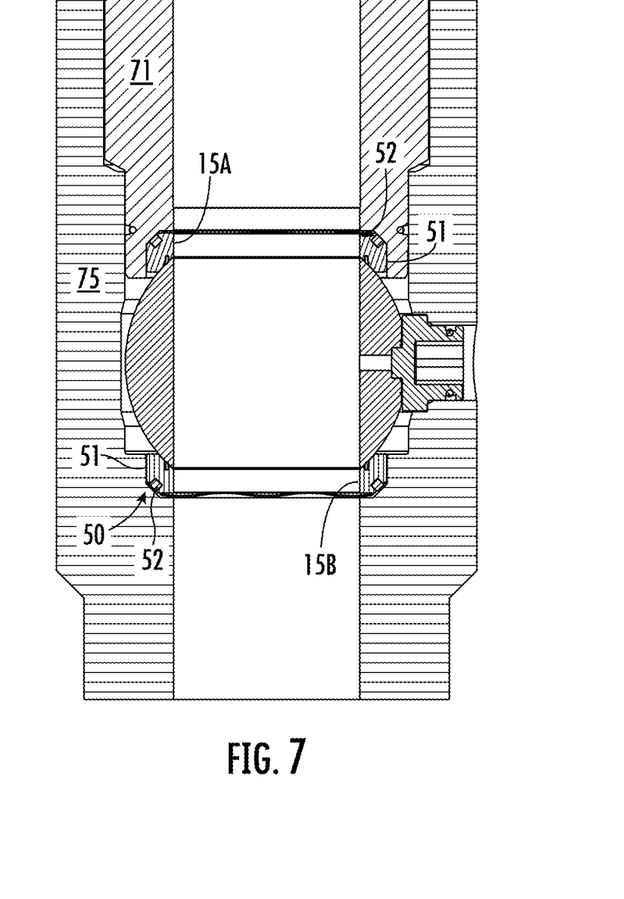
FIG. 7 is a detail sectional view of the ball valve shown in FIG. 6.

FIGS. 6-7 suggest an alternate embodiment of valve sub 70. In this embodiment, ball valve assembly 1 does not include separate upper valve seat carrier 35A and lower valve seat carrier 35B (shown in FIGS. 4-5). Rather, the functionality of upper valve seat carrier 35A and lower valve seat carrier 35B are milled directly into the internal surfaces of upper sub half 71 and lower sub half 75. As seen in FIG. 7, vertical side wall 51 and non-vertical end wall 52 are formed in both upper sub half 71 and lower sub half 75. Vertical side wall 51 corresponds to vertical side wall 16 on each of upper valve seat 15A and lower valve seat 15B, while non-vertical end wall 52 corresponds to non-vertical bottom wall 17 on each of upper valve seat 15A and lower valve seat 15B. Thus, valve housing cavity 50 formed by upper sub half 71 and lower sub half 75 may include vertical side wall 51 and non-vertical end wall 52.

Figure 8:
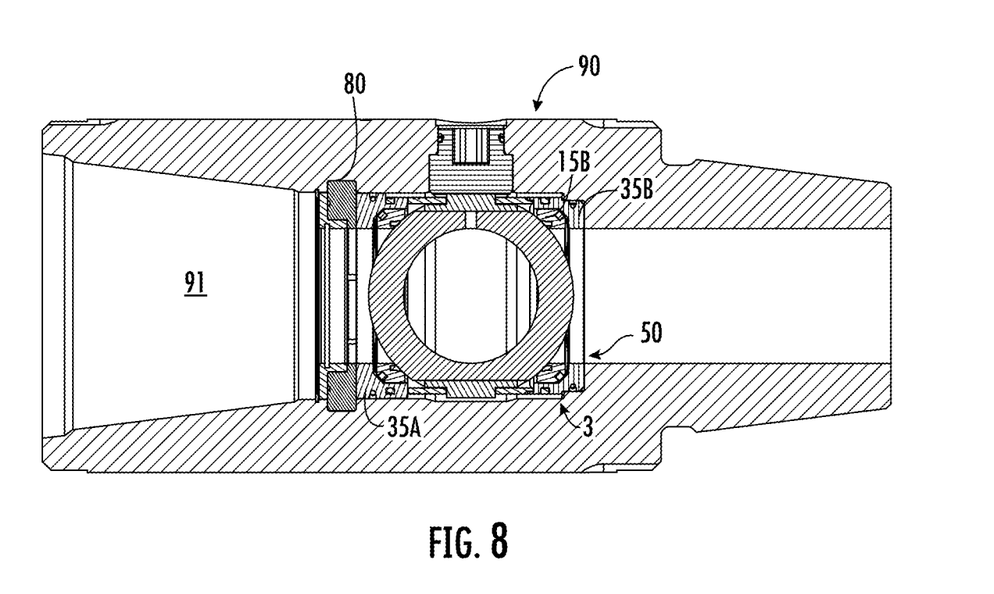
FIG. 8 is a sectional view of an alternate embodiment of the ball valve disposed in an alternate embodiment of the valve sub.

FIG. 8 suggests unitary valve sub 90, which is an alternate embodiment of valve sub 70. Rather than having two sub halves (upper sub half 71 and lower sub half 75 shown in FIGS. 1 and 6), unitary valve sub 90 is a single body with box thread section 91 having a sufficiently wide diameter such that ball valve cartridge 3 may pass therethrough into valve housing cavity 50 of unitary valve sub 90. FIG. 8 illustrates a complete valve cartridge 3 (including upper valve seat carrier 35A and lower valve seat carrier 35B) within valve housing cavity 50 shaped to accept valve cartridge 3. Retaining split ring 80 may be positioned in a ring groove above upper valve seat carrier 35A which acts to retain ball valve cartridge 3 inside valve housing cavity 50. The FIG. 8 embodiment is particularly adapted to function as a Kelly valve.

Figure 9:
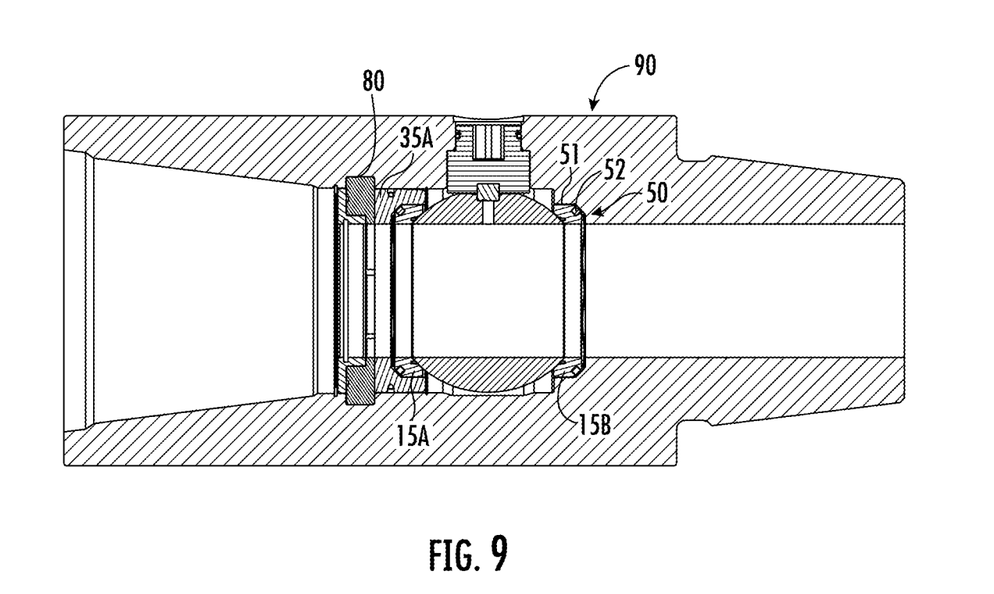
FIG. 9 is a sectional view of an alternate embodiment of the ball valve disposed in an alternate embodiment of the valve sub.

FIG. 9 illustrates an alternate embodiment of unitary valve sub 90 of FIG. 8. In this FIG. 9 embodiment, ball valve assembly 1 does not include lower valve seat carrier 35B. Instead, the lower portion of valve housing cavity 50 includes vertical side wall 51 and non-vertical end wall 52 such that lower valve seat 15B directly engages those surfaces. The upper portion of valve housing cavity 50 houses both upper valve seat 15A and upper valve seat carrier 35A. Again, split ring 80 retains the ball valve assembly 1 within valve housing cavity 50.

Figure 10:
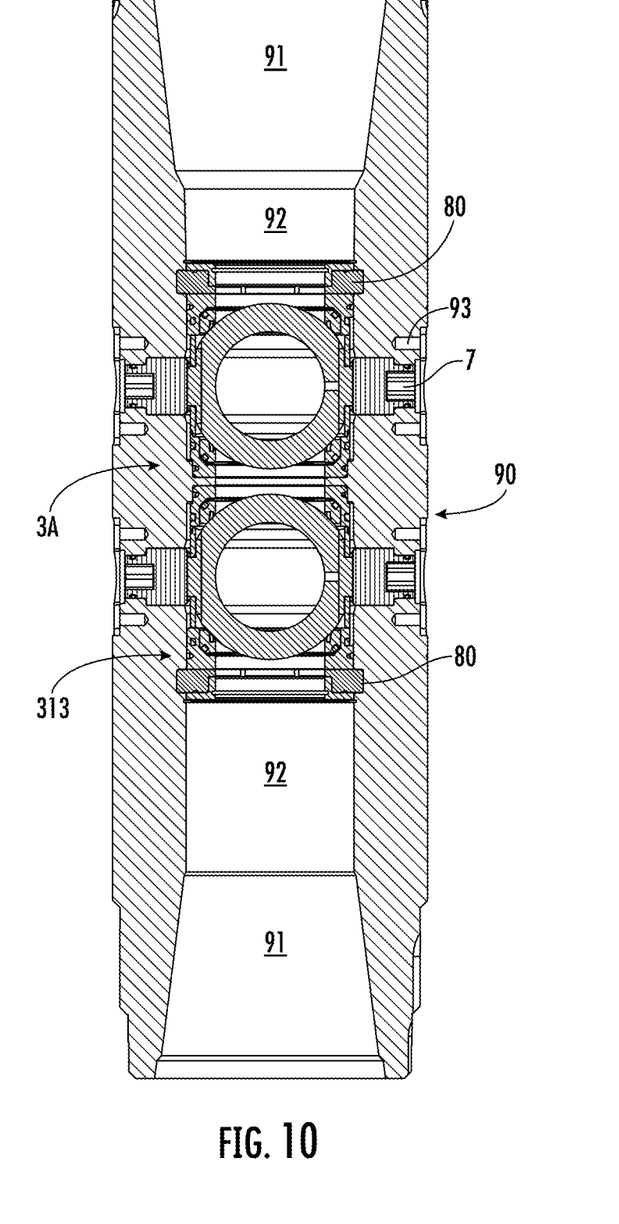
FIG. 10 is a sectional view of two ball valves of the present invention disposed within a valve sub.

FIG. 10 illustrates a further alternate embodiment of unitary valve sub 90 with external box threads 91 on each end of unitary valve sub 90. In the FIG. 10 embodiment, two valve cartridges 3A, 3B are positioned in series in the valve housing allowing the sub to function as a "mud saver valve." Valve cartridges 3A, 3B are maintained in place in sub central passage 92 by first split ring 80 below valve cartridge 3B and second split ring 80 above valve cartridge 3A. Unitary valve sub 90 is also shown with threaded bores 93 to allow for mounting of a powered actuator assembly to enable remote turning of valve stems 7 (i.e., remote opening and closing of the valves).

It will be understood that in the above-described embodiments, upper valve seat 15A and lower valve seat 15B and upper valve seat carrier 35A and lower valve seat carrier 25B are dimensionally the same. This is typically more efficient from the manufacturing and replacement parts standpoint. However, there could be embodiments where the components have different dimensions and are not interchangeable. Similarly, a "ball valve assembly" has been shown to cover many different embodiments, including ball valve assemblies with valve seat carriers (FIGS. 2 and 8), ball valve assemblies with no valve seat carriers (FIG. 7), and ball valve assemblies with a single valve seat carrier (FIG. 9). Although not specifically illustrated, "ball valve assembly" also includes a valve ball combined with two valve seats, e.g., a replacement parts kit for an existing valve sub whose valve seats and valve ball have become excessively worn.

Except as otherwise described or illustrated, each of the components in this device may be formed of steel, another metal, or any other durable material. Portions of the ball valve assembly may be formed of a wear resistant material. Each device described in this disclosure may include any combination of the described components, features, and/or functions of each of the individual device embodiments. Each method described in this disclosure may include any combination of the described steps in any order, including the absence of certain described steps and combinations of steps used in separate embodiments. Any range of numeric values disclosed herein includes any subrange therein. "Plurality" means two or more.

While preferred embodiments have been described, it is to be understood that the embodiments are illustrative only and that the scope of the invention is to be defined solely by the appended claims when accorded a full range of equivalents, many variations and modifications naturally occurring to those skilled in the art from a review hereof.

The invention claimed is:

1. A ball valve, comprising:
   a valve housing including a vertical side wall, a first non-vertical end wall, and a second non-vertical end wall;
   a first valve seat having a bottom wall parallel to the first non-vertical end wall;

a second valve seat having a bottom wall parallel to the second non-vertical end wall;
a first seal positioned between the bottom wall of the first valve seat and the first non-vertical end wall;
a second seal positioned between the bottom wall of the second valve seat and the second non-vertical end wall;
a valve ball positioned between the first valve seat and the second valve seat; and
a central flow passage extending through the first non-vertical end wall of the valve housing, the first valve seat, the valve ball, the second valve seat, and the second non-vertical end wall of the valve housing;
wherein at least a first section of each of the bottom wall of the first valve seat and the first non-vertical end wall of the valve housing are inclined toward the central flow passage at an angle of between about 20° and about 70° relative to the vertical side wall of the valve housing;
wherein the first seal is positioned between the first section of the bottom wall of the first valve seat and the first section of the first non-vertical end wall of the valve housing.

2. The ball valve of claim 1, wherein at least a first section of each of the bottom wall of the second valve seat and the second non-vertical end wall of the valve housing are inclined toward the central flow passage at an angle of between about 20° and about 70° relative to the vertical side wall of the valve housing, wherein the second seal is positioned between the first section of the bottom wall of the second valve seat and the first section of the second non-vertical end wall of the valve housing.

3. The ball valve of claim 1, wherein at least a second section of each of the bottom wall of the first valve seat and the first non-vertical end wall of the valve housing are inclined toward the central flow passage at an angle of about 90° relative to the vertical side wall of the valve housing.

4. The ball valve of claim 2, wherein at least a second section of each of the bottom wall of the second valve seat and the second non-vertical end wall of the valve housing are inclined toward the central flow passage at an angle of about 90° relative to the vertical side wall of the valve housing.

5. The ball valve of claim 1, wherein the first seal and the second seal are one-way seals.

6. The ball valve of claim 1, further comprising a first spring positioned between the first non-vertical end wall of the valve housing and the bottom wall of the first valve seat and a second spring positioned between the second non-vertical end wall of the valve housing and the bottom wall of the second valve seat.

7. The ball valve of claim 6, wherein the first spring and the second spring are wave springs.

8. The ball valve of claim 1, wherein the valve housing further includes a first valve seat carrier and a second valve seat carrier; wherein the first valve seat carrier and the second valve seat carrier define the vertical side wall, the first valve seat carrier defines the first non-vertical end wall, and the second valve seat carrier defines the second non-vertical end wall.

9. The ball valve of claim 8, further comprising two brackets securing the first valve seat carrier to the second valve seat carrier to form a ball valve cartridge.

10. The ball valve of claim 1, wherein the first non-vertical end wall is formed on an interior surface of a valve sub and the second non-vertical end wall is formed on a valve seat carrier.

11. The ball valve of claim 10, wherein a retaining ring secures the valve seat carrier within the valve sub.

12. The ball valve of claim 1, wherein the first non-vertical end wall and the second non-vertical end wall are formed on interior surfaces of a valve sub.

13. The ball valve of claim 1, wherein the first valve seat is configured to move with respect to the valve housing a distance sufficient to cause the first seal to disengage from the first non-vertical end wall of the valve housing.

14. The ball valve of claim 1, wherein no seal engages a portion of the vertical side wall of the valve housing that is aligned with the first valve seat and the second valve seat.

15. The ball valve of claim 9, wherein a height of the ball valve cartridge between outer surfaces of the first valve seat carrier and the second valve seat carrier is less than 140% of an outer diameter of the valve ball.

16. A ball valve, comprising:
a valve housing including a vertical side wall and a non-vertical end wall;
a valve seat having a bottom wall parallel to the non-vertical end wall;
a seal positioned between the bottom wall of the valve seat and the non-vertical end wall of the valve housing;
a valve ball engaging the valve seat; and
a central flow passage extending through the non-vertical end wall of the valve housing, the valve seat, and the valve ball;
wherein at least a first section of each of the bottom wall of the valve seat and the non-vertical end wall of the valve housing are inclined toward the central flow passage at an angle of between about 20° and about 70° relative to the vertical side wall of the valve housing;
wherein the seal is positioned between the first section of the bottom wall of the valve seat and the first section of the non-vertical end wall of the valve housing;
wherein in a closed position the valve seat is configured to move relative to the valve housing a distance sufficient to cause the seal to disengage from the first non-vertical end wall of the valve housing and to provide an equalizing fluid passage between the valve seat and the valve housing in response to a fluid pressure.

17. The ball valve of claim 16, wherein at least a second section of each of the bottom wall of the valve seat and the non-vertical end wall of the valve housing are inclined toward the central flow passage at an angle of about 90° relative to the vertical side wall of the housing.

18. A ball valve assembly, comprising:
a first valve seat and a second valve seat, wherein each of the first valve seat and the second valve seats includes a vertical interior side wall and a bottom wall having a non-vertical section with a seal groove;
a seal positioned in the seal groove in the non-vertical section of each of the first valve seat and the second valve seat;
a valve ball sized to seal against the first valve seat and the second valve seat;
a central flow passage extending through the first valve seat, the valve ball, and the second valve seat;
wherein the non-vertical section of the bottom wall of the first valve seat is inclined toward the central flow passage at an angle of between about 20° and about 70° relative to the vertical interior side wall of the first valve seat.

19. The ball valve assembly of claim 18, wherein the non-vertical section of the bottom wall of the second valve seat is inclined toward the central flow passage at an angle of between about 20° and about 70° relative to the vertical interior side wall of the second valve seat.

\* \* \* \* \*